United States Patent [19]

Chang et al.

[11] Patent Number: 4,701,484
[45] Date of Patent: Oct. 20, 1987

[54] ASPHALT COMPOSITIONS CONTAINING ANTI-STRIPPING ADDITIVES PREPARED FROM AMINES OR POLYAMINES AND ALDEHYDES

[75] Inventors: Dane Chang, Houston; Duane S. Treybig, Lake Jackson, both of Tex.

[73] Assignee: The Dow Chemical Company, Midland, Mich.

[21] Appl. No.: 17,519

[22] Filed: Feb. 24, 1987

[51] Int. Cl.$^4$ .............................................. C08L 95/00
[52] U.S. Cl. ...................................... 524/59; 524/705
[58] Field of Search ...................... 524/59, 62, 64, 705

[56] References Cited

U.S. PATENT DOCUMENTS 2,482,586  9/1949  Hersberger et al. .
2,550,476  4/1951  Hersberger et al. .
2,643,977  6/1953  Hughes .
2,646,400  7/1953  Hughes .
2,727,003 12/1955  Hughes .
2,759,840  8/1956  Crews et al. .
2,759,841  8/1956  Crews et al. .
2,766,132 10/1956  Blair, Jr. et al. .
2,772,179 11/1956  Kalinowski et al. .
2,877,179  3/1959  Hughes .
2,901,372  8/1959  Dybalski et al. .
2,919,204 12/1959  Dybalski et al. .
2,937,106  5/1960  Carpenter et al. .
3,259,512  7/1966  Dickson et al. .
3,262,791  7/1966  Dickson et al. .
3,317,447  5/1967  Black et al. .
3,459,710  8/1969  Caiola et al. .
3,492,352  1/1970  Miller, Jr. et al. .
3,502,723  3/1970  Miller, Jr. et al. .
3,867,162  2/1975  Elste, Jr. .
4,292,413  9/1981  Blount .
4,325,738  4/1982  Plancher et al. .
4,430,465  2/1984  Abbott .
4,515,708  5/1985  Haselgrave et al. .

OTHER PUBLICATIONS

The Function and Chemistry of Asphalt Compositions, Proc. AAPT., vol. 24, pp. 374–391.

Primary Examiner—Paul R. Michl

[57] ABSTRACT

Asphalt compositions are improved by incorporating therein the reaction product of an amine or polyamine with an aldehyde as an anti-stripping agent. These compositions are useful as a pavement material by blending with an aggregate.

11 Claims, No Drawings

ASPHALT COMPOSITIONS CONTAINING ANTI-STRIPPING ADDITIVES PREPARED FROM AMINES OR POLYAMINES AND ALDEHYDES

FIELD OF THE INVENTION

The presention concerns anti-stripping aditives for asphalt compositions.

BACKGROUND OF THE INVENTION

The use of petroleum residuum such as asphalt as a paving material and other construction material is well known. It is also well known that it is desirable to include in such compositions anti-stripping additives so as to reduce the tendency of the paving material which consists of the asphalt and an aggregate material from deteriorating during inclement weather conditions. During the winter months, the low temperatures tend to stiffen and reduce the flexibility of the asphalt binder in the paving material. Traffic loadings then cause the pavement to crack. When that happens, surface water can easily seep into the pavement. As the water goes through freeze-thaw cycles, it strips the asphalt from the aggregate surfaces, reduces the pavement's strength and accelerates deterioration. During the summer months, high temperatures can cause the asphalt pavement to become so soft that traffic can permanently deform the material and create shoving, rutting, bleeding and flushing problems. The incorporation of an anti-stripping additive into the asphalt composition employed in preparing the pavement increases the life of the pavement. It would be desirable to have anti-stripping additives for asphalt which improves its adhesion to the aggregate material.

SUMMARY OF THE INVENTION

The present invention pertains to a composition which comprises a blend of
(A) bituminous material and
(B) the product resulting from reacting at a temperature sufficient to complete the reaction
  (1) at least one aldehyde; with
  (2) at least one material selected from
    (a) at least one organic amine;
    (b) at least one organic polyamine;
    (c) at least one hydrohalide salt of an organic amine;
    (d) at least one hydrohalide salt of an organic polyamine; or
    (e) a combination of any two or more of (a), (b), (c) or (d);
  wherein components (1) and (2) are employed in quantities which provide a ratio of carbonyl groups per amine hydrogen atom of
    (i) when the aldehyde is an $\alpha,\beta$-ethylenically unsaturated aldehyde, from about 0.025:1 to about 0.6:1, suitably from about 0.12:1 to about 0.33:1, most suitably from about 0.18:1 to about 0.28:1; and
    (ii) when the aldehyde is a saturated aliphatic aldehyde, aromatic aldehyde or an unsaturated aldehyde having unreactive carbon-carbon double bonds, from aout 0.025:1 to about 1:1, suitably from about 0.12:1 to about 0.6:1, most suitably from about 0.14:1 to about 0.5:1; and
wherein components (A) and (B) are employed in quantities which provide from about 0.05 to about 10, suitably from about 0.25 to about 5, more suitably from about 0.5 to about 2.5, most suitably from about 0.5 to about 1 percent by weight of component (B) based upon the combined weight of components (A) and (B).

Another aspect of the present invention pertains to a composition which comprises a blend of
(I) bituminous material and
(II) the product resulting from reacting at a temperature sufficient to complete the reaction
  (A) the product resulting from reacting at a temperature sufficient to complete the reaction
    (1) at least one aldehyde; with
    (2) at least one material selected from
      (a) at least one organic amine;
      (b) at least one organic polyamine;
      (c) at least one hydrohalide salt of an organic amine;
      (d) at least one hydrohalide salt of an organic polyamine; or
      (e) a combination of any two or more of (a), (b), (c) or (d);
    wherein components (1) and (2) are employed in quantities which provide a ratio of carbonyl groups per amine hydrogen atom of
      (i) when the aldehyde is an $\alpha,\beta$-ethylenically unsaturated aldehyde, from about 0.025:1 to about 0.6:1, suitably from about 0.12:1 to about 0.33:1, most suitably from 0.18:1 to about 0.28:1; and
      (ii) when the aldehyde is a saturated aliphatic aldehyde, aromatic aldehyde or an unsaturated aldehyde having unreactive carbon-carbon double bonds, from about 0.025:1 to about 1:1, suitably from about 0.12:1 to about 0.6:1, most suitably from about 0.14:1 to about 0.5:1; and
  (B) at least one organic material containing a carboxyl group and having less than about 14, suitably less than about 10 carbon atoms; wherein components (II-A) and (II-B) are employed in quantities which provide a ratio of the number of carboxyl groups per amine hydrogen atom of from about 0.005:1 to about 1.5:1, suitably from about 0.025:1 to about 0.7:1, more suitably from about 0.025:1 to about 0.5:1, most suitably from about 0.05:1 to about 0.25:1; and
wherein components (I) and (II) are employed in quantities which provide from about 0.05 to about 10, suitably from about 0.25 to about 5, more suitably from about 0.5 to about 2.5, most suitably from about 0.5 to about 1 percent by weight of component (II) based upon the combined weight of components (I) and (II).

The present invention provides anti-stripping additives for asphalt which improves its adhesion to the aggregate material.

DETAILED DESCRIPTION OF THE INVENTION

The bituminous material employed herein in the practice of the present invention is not critical. Any bitumen, asphalt or crude residuum containing alphaltenes can be employed. U.S. Pat. No. 3,317,447 contains a good description of useful bituminous materials which are useful herein and is incorporated herein by reference. In general, the asphalts which can be employed include conventional petroleum asphalts, natural asphalts, gilsonite, air blown asphalts, coal tar and other similar materials. The asphalts are characterized by having penetration grades up to 300 as measured by ASTM Method D5. Preferred asphalts are the normal paving asphalts (e.g. AC5, AC10, AC20, and AC30. AC indicates asphalt cement and the number indicates the viscosity at 140° F. in poise divided by 100).

The temperature for the reaction between the aldehyde and the organic amine or organic polyamine depends on the type of aldehyde. When an α,β-ethylenically unsaturated aldehyde is reacted with an organic amine or organic polyamine, the reaction is usually conducted at temperatures of from about 0° C. to about 150° C., suitably from about 0° C. to about 100° C. and most suitably from about 25° C. to about 60° C. The α,β-ethylenically unsaturated aldehyde has a reactive carbon-carbon double bond. The reaction between saturated aldehydes, aromatic aldehydes or unsaturated aldehydes with an unreactive carbon-carbon double bond with an organic amine or an organic polyamine is usually conducted in two stages. The first stage involves heating the reactants to a temperature of from about 0° C. to about 150° C., suitably from about 25° C. to about 150° C. and most suitably from about 60° C. to about 100° C. until water ceases to evolve overhead. The second stage of heating is carried out to insure that the reaction between the saturated aldehyde, aromatic aldehyde or unsaturated aldehyde having an unreactive carbon-carbon double bond and the organic amine or organic polyamine has been driven to completion. The second stage is not strictly necessary. It involves heating the reactants to a temperature of from about 150° C. to about 300° C., suitably from about 180° C. to about 250° C. and most suitably from about 180° C. to about 200° C. The higher temperatures require shorter reaction times to complete the reaction whereas the lower temperatures require longer reaction times to complete the reaction. The reaction can be conducted at any pressure including atmospheric pressure and pressures above and below atmospheric pressure. Suitably, the reaction is carried out in an inert atmosphere such as nitrogen, argon or the like.

The reaction between the aldehyde and the organic amine or polyamine is usually conducted in the presence of an inert solvent. The solvent serves as a reaction, polymerization or oligomerization diluent. The choice of solvent is generally dependent upon the boiling point of the amine or polyamine, the solubility of the amine or polyamine and the solubility of the resulting product or oligomers. Advantageously, the solvent is one in which both the monomers and resultant product or oligomers are soluble. Suitable solvents include, for example, water, alcohols, cyclic ethers, amides, aromatic and aliphatic hydrocarbons and the like. Particularly suitable solvents include, for example, methanol, ethanol, isopropanol, butanol, benzene, dioxane, dimethylformamide, tetrahydrofuran, combinations thereof and the like. The solvent can be removed from the reaction product by distillation.

The reaction between the reaction product of the aldehyde and the organic amine or organic polyamine and the organic material containing carboxyl groups can be conducted at temperatures of from about 0° C. to about 300° C., suitably from about 50° C. to about 300° C. A salt is believed to be the primary product formed when the reaction product of the aldehyde and the organic amine or organic polyamine is reacted with the organic material containing carboxyl groups at temperatures of from about 0° C. to about 150° C., suitably from about 50° C. to about 100° C. An amide is believed to be the primary product formed at temperatures from about >150° C. to about 300° C., suitably from about 160° C. to about 240° C., most suitably from about 180° C. to about 220° C. By conducting the reaction under conditions for the formation of an amide under a partial vacuum, the reaction can be completed at somewhat lower temperatures. Completeness of the amide reaction can be determined by measurement of the amount of water evolved during the reaction. If desired, the reaction can be conducted in the presence of a solvent or a mixture of solvents. In the process for the formation of an amide, the solvent forms an azeotropic mixture for removing water and by-products. Suitable such solvents include, for example, alcohols, aliphatic or aromatic hydrocarbons, amides, cyclic ethers, and the like. Particularly suitable solvents include, for example, methanol, ethanol, isopropanol, butanol, benzene, toluene, hexane and the like. Other suitable solvents include, for example, dioxane, dimethylformamide, tetrahydrofuran and the like.

Suitable aldehydes which can be employed herein include those represented by the general formulas:

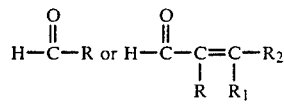

wherein each R, $R_1$ and $R_2$ are independently hydrogen or a hydrocarbyl or hydrocarbyloxy group or substituted hydrocarbyl or hydrocarbyloxy group having from about 1 to about 20, suitably from about 1 to about 7 carbon atoms per molecule. Suitable such substituted hydrocarbyl or hydrocarbyloxy groups include, for example, those substituted with halo, alkoxy or nitro groups.

The term hydrocarbyl as employed herein includes, alkyl, cycloalkyl, aryl, aralkyl, alkaryl, alkenyl and the like. Likewise, the term hydrocarbyloxy as employed herein includes, alkoxy, cycloalkoxy, aryloxy, aralkoxy, alkaryloxy, alkenyloxy and the like.

Examples of particularly suitable α,β-ethylenically unsaturated aldehydes are disclosed in U.S. Pat. No. 3,459,710 which is incorporated herein by reference. Other suitable α,β-ethylenically unsaturated aldehydes include, for example, furfuryl aldehyde, trans-2-hexenal, trans-2-heptenal, 3,7-dimethyl-2,6-octadienal, 3-phenyl-2-propenal (transcinnamaldehyde) 2-methyl-3-phenyl-2-propenal (α-methylcinnamaldehyde), 2-chloro-3-phenyl-2-propenal (α-chloro-cinnamaldehyde), 2-bromo-3-phenyl-2-propenal (α-bromocinnamaldehyde), 3-(2-nitrophenyl)-2-propenal (2-nitrocinnamaldehyde), mixtures thereof and the like. The preferred α,β-ethylenically unsaturated aldehyde is acrolein or mixtures thereof with other α,β-ethylenically unsaturated aldehydes.

Examples of particularly suitable saturated and aromatic aldehydes which can be employed herein are disclosed in U.S. Pat. Nos. 2,727,003 and 2,877,179 which are incorporated herein by reference. Other suitable saturated aldehydes include, for example, decanal, undecanal, 2-methylundecanal, 2,6,10-trimethylundecanal, 2-pentyldecanal, hexadecanal, 2,6-dimethyltetradecanal, heptadecanal, octadecanal, nonadecanal, mixtures thereof and the like. Other suitable aromatic aldehydes include, for example, benzaldehyde, benzeneacetaldehyde, 2-bromobenzaldehyde, 2-methoxybenzaldehyde, 2,3-dimethoxybenzaldehyde, benzeneacetaldehyde, 4-(methylthio)benzaldehyde, 1- pyrenecarboxaldehyde, 9H-fluorene-2-carboxaldehyde, 4-butoxybenzaldehyde, mixtures thereof and the like. The preferred saturated and aromatic aldehydes are formaldehyde, acetaldehyde, propanal, pentanal, hexanal, heptanal (heptaldehyde), octanal and benzaldehyde or mixtures thereof.

Other suitable aldehydes are unsaturated aldehydes where the carbon-carbon double bond is located in a position relative to the carbonyl carbon which is not the $\alpha,\beta$-position. The carbon-carbon double bond of such unsaturated aldehydes is unreactive with the amines. Examples of such unsaturated aldehydes include, for example, 4-nonenal, 7-nonenal, 3,6-nonadienal, 4,7-nonadienal, 8-pentadecenal, 6,12-octadecadienal, 11-hexadecenal, 11-octadecenal, cis-7-tetradecenal, 3,7-dimethyl-6-octenal, mixtures thereof and the like.

Suitable organic amines which can be employed herein include those disclosed in U.S. Pat. Nos. 3,459,710 and 4,292,413 which are incorporated herein by reference. Other organic amines include, for example triethylenetetramine, tetraethylenepentamine, pentaethylenehexamine, hexaethyleneheptamine, polyoxypropyleneamine, 2-(2-aminoethylamino)ethanol, N-decyl-1,2-ethanediamine, N-undecyl-1,2-ethanediamine, N-tridecyl-1,2-ethanediamine, N-pentadecyl-1,2-ethanediamine, N-hexadecyl-1,2-ethanediamine, N-heptadecyl-1,2-ethanediamine, N-octadecyl-1,2-ethanediamine, N-decyl-1,3-propanediamine, N-dodecyl-1,3-propanediamine, N-tetradecyl-1,3-propanediamine, N-hexadecyl-1,3-propane-diamine, N-heptadecyl-1,3-propanediamine, N-octadecyl-1,2-propanediamine, N-octadecyl-1,3-propanediamine, octadecen-1,3-propanediamine, 1-heptanamine, 1-octanamine, 1-nonamine, 1-decanamine, 1-undecanamine, 1-dodecanamine, 1-tridecanamine, 1-tetradecanamine, 1-pentadecanamine, 1-hexadecanamine, 1-heptadecanamine, 1-octadecanamine, octadecen-1-amine, N-methylhexanamine, N-methylheptanamine, N-methyl-1-decanamine, N-(1-methylethyl)-1-pentanamine, N-(1-methylethyl)-1-decanamine, N-methyl-1-octadecanamine, N-dodecyl-1-dodecanamine, and the like as well as mixtures thereof.

Particularly suitable organic polyamines which can be employed herein include, for example, those represented by the formulas

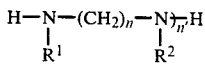

FORMULA I

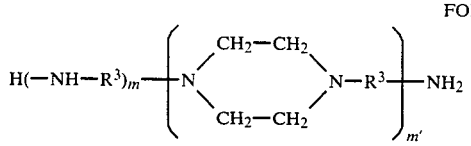

FORMULA II wherein each $R^1$ and $R^2$ is independently hydrogen or a hydrocarbyl group or hydroxyl substituted hydrocarbyl group or amine substituted hydrocarbyl group having from about 1 to about 36, suitably from about 1 to about 20, more suitably from about 1 to about 10, most suitably from about 1 to about 3, carbon atoms; each $R^3$ is independently a divalent hydrocarbyl group having from 1 to about 36, suitably from about 1 to about 20, more suitably from about 1 to about 10, most suitably from about 1 to about 3, carbon atoms; m has a value from zero to about 8; m' has a value from 1 to about 4; n has a value of 2 or 3 and n' has a value from 1 to about 10. The term hydrocarbyl as employed herein includes, alkyl, cycloalkyl, aryl, aralkyl, alkaryl, alkenyl and the like.

The amines or polyamines can be partially alkoxylated such as partially ethoxylated, partially propoxylated, partially butoxylated or partially polyethoxylated, partially polypropoxylated or partially polybutoxylated, provided that there remains at least one amine hydrogen atom per molecule. Also suitable are the aminated polyols. Suitable such aminated polyols include, for example animated ethylene glycol, aminated polyoxyethylene glycol, aminated propylene glycol, aminated poloxypropylene glycol, aminated glycerine, aminated reaction products of ammonia or an amine such as methylamine, ethylamine, propylamine, butylamine, ethylenediamine, propylenediamine, diethylenetriamne or the like with a alkylene oxide such as ethylene oxide, propylene oxide, butylene oxide, mixtures thereof and the like, aminated reaction products of trimethylol propane with an alkylene oxide such as ethylene oxide, propylene oxide, butylene oxide, mixtures thereof and the like. Suitable such aminated polyols include, those disclosed in U.S. Pat. No. 4,374,222.

The amine or polyamine can be neutralized with a hydrohalide. Particularly suitable hydrohalides include, for example, hydrochlorides, hydrobromides, hydroiodides, combinations thereof and the like.

Suitable carboxylic acids which can be employed herein include, for example, acetic acid, propionic acid, hexanoic acid (caproic acid), heptanoic acid, octanoic acid (caprylic acid), nonanoic acid, decanoic acid, undecanoic acid, dodecanoic acid (lauric acid), tridecanoic acid, tetradecanoic acid (myristic acid), 2-ethylhexanoic acid, 3-hexenoic acid, 2-octenoic acid, 2-nonenoic acid, 2-decenoic acid, undecylenic acid, 2,4,6-octatrienic acid, chloroacetic acid, 2-bromobutyric acid, benzoic acid, mixtures thereof and the like.

The $\alpha,\beta$-monoethylenically unsaturated aldehyde consists of two reactive groups which are capable of undergoing reaction with an amine hydrogen. These two groups are, (a) a carbonyl group and (b) a carbon-carbon double bond. The carbon-carbon double bond reacts with an amine to give a beta-amino substituted carbonyl compound. The carbon-carbon double bond is reactive with amines because of the electron withdrawing ability of the carbonyl group and the existance of the conjugated system that permits formation of a resonance-stabilized anion. The carbonyl of an $\alpha,\beta$-monoethylenically unsaturated aldehyde reacts with a primary amine to form an imine which readily cyclizes if labile (as defined in U.S. Pat. No. 4,315,087 which is incorporated herein by reference) amine hydrogens are available, suitably in the gamma or delta position relative to the nitrogen atom of the imine. Am imidazolidine ring is formed from the reaction of the carbonyl group of an $\alpha,\beta$-monoethylenically unsaturated aldehyde with an ethylene polyamine while a hexahydropyrimidine ring is formed from the reaction of the carbonyl group of an $\alpha,\beta$-monoethylenically unsaturated aldehyde with a propylene polyamine.

The formation of oligomers or polymer products from the reaction of an $\alpha,\beta$-monoethylenically unsaturated aldehyde with a diamine or polyamine relies on the $\alpha,\beta$-monoethylenically unsaturated aldehyde having both a carbonyl group and an activated carbon-carbon double bond. After the carbonyl group of an $\alpha,\beta$-monoethylenically unsaturated aldehyde reacts with the amine, the carbon-carbon double bond is no longer activated and is unreactive with amines. The inactivated carbon-carbon double bond terminates the polymer reaction.

The oligomer or polymer products obtained from the reaction of α,β-monoethylenically unsaturated aldehydes with organic polyamines, usually have a weight-average molecular weight of less than about 1,000. The polymers or oligomers which are believed to be formed within the scope of the reaction products of this invention comprise compounds having one or more vinyl, imine, imidazolidine or hexahydropyrimidine ring, enamine, ether and hydroxyl functional groups. In addition, the reaction of an amine containing piperazine rings with an α,β-ethylenically unsaturated aldehyde introduces piperazine rings into the constituents of the product. Some of the possible constituents of the oligomers formed from the reaction of, for example, acrolein with ethylenediamine are believed to be represented by the following structures, although we do not wish to be limited by this theory.

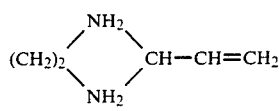
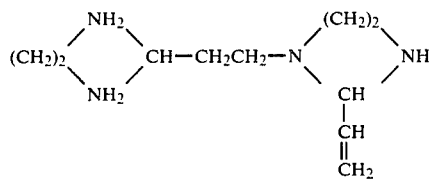
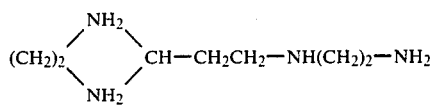
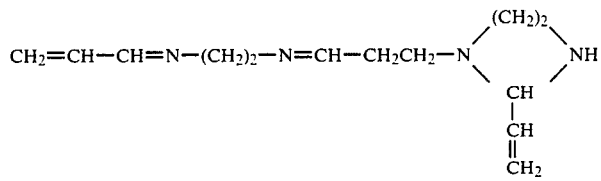
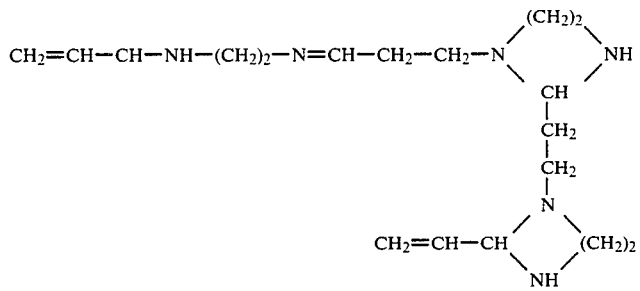

The saturated aldehydes, aromatic aldehydes and unsaturated aldehydes with unreactive carbon-carbon double bonds contain only one reactive group which is capable of undergoing reaction with an amine hydrogen. This one reactive group is the carbonyl group. The carbonyl of the saturated aldehyde, aromatic aldehyde or unsaturated aldehyde with unreactive carbon-carbon double bond reacts with a primary amine to form an imine which readily cyclizes if labile amine hydrogens are present. Since saturated aldehydes, aromatic aldehydes and unsaturated aldehydes with unreactive carbon-carbon double bonds do not contain an activated carbon-carbon double bond, they do not form oligomers or polymer products with a diamine or polyamine. The primary products formed from the reaction of, for example, heptaldehyde with ethylenediamine are believed to be represented by the following two structures, although we do not intend to be limited to or bound by this supposition.

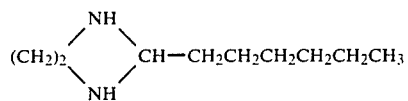

and

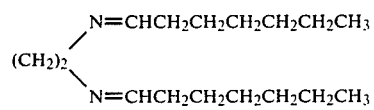

The asphalt compositions of the present invention can be blended with any of the aggregate materials known to the art in order to form pavement compositions.

The following examples are illustrative of the invention, but are not intended to limit the scope thereof in any manner.

EXAMPLE 1

Ethylenediamine (514.53 g, 8.56 moles, 34.3 amine hydrogen equivalents, AHE) and methanol (452.4 g) are added to a 3 liter jacketed resin kettle equipped with an immersion thermometer, mechanical stirrer, addition funnel, condenser and nitrogen purge system. The reactor contents are cooled to 12° C. by pumping a chilled aqueous solution of ethylene glycol through the jacket of the resin kettle. A methanolic solution of acrolein is prepared by mixing 482.12 g (8.6 moles) of acrolein with 454.21 g of methanol. This methanolic solution of acrolein is added dropwise to the methanolic solution of ethylenediamine at such a rate that the rise in temperature does not exceed 22° C. The reactor contents are subjected to rotary evaporation under full vacuum at boiling water temperature.

EXAMPLE 2

Ethylenediamine (872.41 g, 14.52 moles, 58.16 AHE) and methanol (758.35 g) are added to a 4 liter jacketed resin kettle equipped with an immersion thermometer, mechanical stirrer, addition funnel, condenser and nitrogen purge system. The reactor contents are cooled to −0.2° C. by pumping a chilled aqueous solution of ethylene glycol through the jacket of the resin kettle. A methanolic solution of acrolein is prepared by mixing 810.62 g (14.5 moles) of acrolein with 778.48 g of methanol. This methanolic solution of acrolein is added dropwise to the methanolic solution of ethylenediamine over a period of 1140 minutes (86,400 s) and at such a rate that the rise in temperature does not exceed 5° C. The reactor contents are subjected to rotary evaporation under full vacuum at boiling water temperature. Isopropanol (321.77 g) is added to the rotary evaporated bottoms (711.36 g) and this mixture is again rotary evaporated under full vacuum at boiling water temperature.

EXAMPLE 3

Ethylenediamine (516.78 g, 8.60 moles, 34.45 AHE) and methanol (451.71 g) are added to a 3 liter jacketed resin kettle equipped with an immersion thermometer, mechanical stirrer, addition funnel, condenser and nitrogen purge system. The reactor contents are cooled to 4° C. by pumping a chilled aqueous solution of ethylene glycol through the jacket of the resin kettle. A methanolic solution of acrolein is prepared by mixing 481.91 g (8.32 moles) of acrolein with 452.9 g of methanol. This methanolic solution of acrolein is added dropwise to the methanolic solution of ethylenediamine at such a rate that the rise in temperature does not exceed 7° C. The reactor contents are subjected to rotary evaporation under full vacuum at boiling water temperature. Isopropanol (455.52 g) is added to the rotary evaporated bottoms and this mixture is again rotary evaporated under full vacuum at boiling water temperature. The resultant ethylenediamine/acrolein oligomers (37 g, approximately 0.57 AHE), lauric acid (94.1 g, 0.047 mole) and isopropanol (196 g) are weighed into a 1 liter resin kettle equipped with an immersion thermometer, mechanical stirrer, addition funnel, condenser and nitrogen purge system. The reactor contents are refluxed at 84° C. for 1 hour. Then the isopropanol and water are removed by using a Barrett trap as the reaction temperature is increased from 84° C. to 210° C. The reactor contents are heated an additional 260 minutes at 210° C., cooled to room temperature and dissolved in isopropanol by refluxing at 84° C. for 1 hour.

EXAMPLE 4

Ethylenediamine (114.35 g, 1.9 moles, 7.62 AHE), KEMAMINE P-650 a mixture of C10–C18 primary amines commercially available from Witco Chemical Corp. which consists primarily of 1-decanamine, 1-dodecanamine, 1-tetradecanamine, 1-hexadecanamine, 1-octadecanamine and octadecen-1-amine (20.28 g, 0.1 mole, 0.199 AHE) are weighed into a 1 liter resin kettle equipped with an immersion thermometer, mechanical stirrer, addition funnel, condenser and nitrogen purge system. The reactor contents are cooled to 1° C. with an ice water bath. A methanolic solution of acrolein is prepared by mixing 112.07 g (2 moles) of acrolein with 157.58 g of methanol. This methanolic solution of acrolein is added dropwise to the methanolic solution of ethylenediamine and KEMAMINE P-650 over a period of 87 minutes at such a rate that the rise in temperature does not exceed 16° C. The reactor contents are rotary evaporated under full vacuum at boiling water temperature. Twice, approximately 100 g of isopropanol is added to the rotary evaporated bottoms, and this mixture is rotary evaporated under full vacuum at boiling water temperature giving an orange viscous liquid.

EXAMPLE 5

N-(2-aminoethyl)piperazine (397.9 g, 3.08 moles, 9.25 AHE) and methanol (271.88 g) are weighed into a 1 liter resin kettle equipped with an immersion thermometer, mechanical stirrer, addition funnel, condenser and nitrogen purge system. The reactor contents are stirred while cooled to 10° C. A methanolic solution of acrolein is prepared by mixing 80.26 g (1.43 moles) of acrolein with 75.82 g of methanol. This methanolic solution of acrolein is added dropwise to the methanolic solution of N-(2-aminoethyl)piperazine over a period of 210 minutes at such a rate that the rise in temperature does not exceed 15° C. The reactor contents are subjected to rotary evaporation under full vacuum at boiling water temperature.

EXAMPLE 6

Triethylenetetramine (1325.66 g, 9.06 moles, 55.24 AHE) and 900.73 g of methanol are added to a 4 liter jacketed resin kettle equipped with an immersion thermometer, mechanical stirrer, addition funnel, condenser and nitrogen purge system. The reactor contents are cooled to −0.2° C. by pumping a chilled aqueous solution of ethylene glycol through the jacket of the resin kettle. A methanolic solution of acrolein is prepared by mixing 484.96 g (8.65 moles) of acrolein with 489.62 g of methanol. This methanolic solution of acrolein is added dropwise to the methanolic solution of triethylenetetramine over a period of 1503 minutes and at such a rate that the rise in temperature does not exceed 10° C. The reactor contents are subjected to rotary evaporation under full vacuum at boiling water temperature.

EXAMPLE 7

Ethyleneamine E-100, a mixture of tetraethylenepentamine, pentaethylenehexamine and hexaethyleneheptamine commercially available from The Dow Chemical Company, (770.94 g, 2.68 moles, 21.415 AHE) and 495.6 g of methanol are weighed into a 3-neck 2 liter round bottom flask equipped with an immersion thermometer, mechanical stirrer, condenser and nitrogen purge system. The reactor contents are cooled to 10° C. with an ice bath. A methanolic solution of acrolein is prepared by mixing 282.24 g (5.03 moles) of acrolein with 322.45 g of methanol. This methanolic solution of acrolein is pumped from a reservoir at a rate of 3 ml/min (0.05 ml/s) through a 0.5–1.0 ml i.d. stainless steel transfer line for subsurface addition into the methanolic solution of ethylenamine E-100 with a Milton Roy pump. The methanolic solution of acrolein is added to the reactor over a period of 250 minutes at a temperature between 10° C. and 15° C. The reactor contents are rotary evaporated under full vacuum at boiling water temperature.

EXAMPLE 8

KEMAMINE P-650, described in Example 4, (68.01 g, 0.33 mole, 0.67 AHE) is weighed into a 4-neck 250 ml round bottom flask equipped with an immersion thermometer, mechanical stirrer, condenser and nitrogen purge system. The fatty amines are stirred and cooled to 18° C. with an ice water bath. Then 37% concentrated hydrochloric acid (38.69 g, 0.39 mole) is added dropwise over a 20 minute period to form amine hydrochlorides. The reactor contents are then heated between 99°

C.–105° C. and an aqueous solution of 37% formaldehyde (53.72 g, 0.66 mole) is added dropwise over a period of 44 minutes. The reactor contents are heated between 94° C.–97° C. for 221 minutes and then 52.7 g of 1-butanol is added to the reactor contents. The reactor temperature is maintained between 92° C.–96° C. for 47 minutes. A Barrett trap is installed and water and 1-butanol are removed as the reaction temperature is increased from 96° C.–210° C. over a period of 66 minutes. After cooling to room temperature, the reactor contents are a dark brown waxy solid.

EXAMPLE 9

Diethylenetriamine (650.68 g, 6.31 moles, 31.58 AHE) and 374.81 g of methanol are weighed into a 2 liter jacketed resin kettle equipped with a thermometer, mechanical stirrer, water cooled condenser and nitrogen purge system. The reactor contents are stirred while cooled to 7° C. A methanolic solution of acrolein is prepared by mixing 332.36 g (5.93 moles) of acrolein with 309.3 grams of methanol. This methanolic solution of acrolein is pumped from a reservoir at a rate of 2.5 ml/minute (0.0417 ml/s) into the methanolic solution of the diethylenetriamine with a Milton Roy pump. The methanolic solution of acrolein is added to the reactor over a period of 335 minutes at a temperature between 7° C. to 22° C. The reactor contents are rotary evaporated under full vacuum at boiling water temperature. Isopropanol (471 g) is added to the rotary evaporated bottoms and this mixture is rotary evaporated under full vacuum at boiling water temperature.

EXAMPLE 10

Ethylenediamine (305.71 g, 5.09 moles, 20.38 AHE) and 462.65 g of isopropanol are weighed into a 2 liter jacketed resin kettle equipped with a thermometer, mechanical stirrer, water cooled condenser and nitrogen purge system. The reactor contents are stirred while cooled between 10° C. and 20° C. An isopropanol solution of crotonaldehyde is prepared by mixing 359.69 g (5.13 moles) of crotonaldehyde with 353.71 grams of isopropanol. This isopropanol solution of crotonaldehyde is pumped from a reservoir at a rate of 3.4 ml/minute (0.0567 ml/s) into the isopropanol solution of the ethylenediamine with a Milton Roy pump. The isopropanol solution of crotonaldehyde is added to the reactor over a period of 265 minutes at a temperature between 11° C. and 20° C. The resultant reactor contents are an isopropanol and water solution of 37 weight percent of the ethylenediamine/crotonaldehyde reaction product.

EXAMPLE 11

Diethylenetriamine (51.23 g, 0.5 mole, 2.49 AHE) and benzene (27.64 g) are weighed into a 4-neck 250 ml round bottom flask equipped with an immersion thermometer, condenser, mechanical stirrer, nitrogen purge system and addition funnel. Benzaldehyde (48.5 g, 0.46 mole) is added slowly to the reactor contents between 85° C. and 89° C. during a 75 minute period. Benzene and water are removed with a Barrett trap as the reaction temperature is increased to 190° C. over a period of 45 minutes. The reactor contents are heated for an additional 2 hours at 190° C. The reactor contents are cooled to room temperature and benzene (31.88 g) is added. Heptaldehyde (43.32 g, 0.38 mole) is added slowly to the reactor contents at 80° C. over a 65 minute period. Benzene and water are removed with a Barrett trap as the reaction temperature is increased to 190° C. over a period of 43 minutes. The reactor contents are heated for an additional 2 hours at 190° C.

EXAMPLE 12

Ethylenediamine (21.9 g, 0.36 mole, 1.46 AHE) and benzene (28.37 g) are weighed into a reactor as described in Example 11. Benzaldehyde (38.72 g, 0.36 mole) is added slowly to the reactor contents at 85° C. over a 32 minute period. Benzene and water are removed with a Barrett trap as the reaction temperature is increased to 190° C. over a period of 73 minutes. The reactor contents are heated for an additional 2 hours at 190° C. The reactor contents are cooled to room temperature and benzene (31.88 g) is added. Heptaldehyde (21.65 g, 0.19 mole) is added slowly to the reactor contents at 80° C. over a 39 minute period. Benzene and water are removed with a Barrett trap as the reaction temperature is increased to 190° C. over a period of 52 minutes. The reactor contents are heated for an additional 2 hours at 190° C.

EXAMPLE 13

Diethylenetriamine (85 g, 0.82 mole, 4.13 AHE) and benzene (42.12 g) are weighed into a reactor as described in Example 11. A 37% solution of formaldehyde (61.06 g, 0.75 mole) is added slowly to the reactor contents between 68° C. and 70° C. over a 195 minute period. Benzene and water are removed with a Barrett trap as the reaction temperature is increased to 190° C. over a period of 126 minutes. The reactor contents are heated for an additional 2 hours at 190° C. The reactor contents are cooled to 100° C. and heptaldehyde (85.64 g, 0.75 mole) is added slowly to the reactor contents between 95° C. and 100° C. over a 50 minute period. Benzene and water are removed with a Barrett trap as the reaction temperature is increased to 190° C. over a period of 25 minutes. The reactor contents are heated for an additional 3 hours and 20 minutes at 190° C.

EXAMPLE 14

The above prepared anti-stripping additives or agents are mixed with asphalt and the resultant blend is then mixed with an aggregate and subjected to a boil test and freeze-thaw test. A description of the tests are as follows and the results are given in the Table. In these tests, AC-20 type asphalt obtained from Texas Cosden Oil & Chemical Co. is employed. Five siliceous aggregates which have shown signs of serious stripping problems are tested. The names and the origins and silicon contents of these aggregates are:
Davidson (Georgia, 81% Si)
Gifford-Hill (Bryan, Tex., 100% Si)
Waco (Waco, Tex., 98% Si)
Granite (California, 61% Si)
Helms (Nevada, 63% Si)

BOIL TEST

Preparation of Mixtures

In order to minimize the effect of aggregate interlock while maximizing the bond between the aggregate and the asphalt cement, each individual aggregate is first wet sieved to obtain the portion that passes No. 8 sieve and retained on No. 20 sieve (U.S. standard testing sieve series, ASTM E-11). Then 100 g of this size dry aggregate is heated to 160° C. plus or minus 3° C. for at least 2 hours. The asphalt cement (6 g) with 60 mg of anti-stripping additive is heated and stirred at 160° C. for 5 minutes. At the appropriate time, the hot dry aggregate is poured into the asphalt and mixed manually on a hot plate as rapidly and thoroughly as possible for 5 minutes. This mixture is then allowed to cool at room temperature for at least 2 hours before testing.

Test Procedure

A 1-liter beaker is filled with 500 ml deionized water and heated to boiling. The prepared aggregate-asphalt mixture is added to the boiling water which temporarily lowers the temperature below the boiling point. The heat is then increased so that the water reboiled in approximately 2 to 3 minutes. The water is maintained at the boiling temperature for 10 minutes while stirring with a glass rod at 3-minute intervals. During and after boiling, the stripped asphalt is skimmed away from the water surface with a paper towel to prevent recoating the aggregate. The mixture is then poured onto a paper towel and allowed to dry. The amount of asphalt retained on the mixture is determined by visual rating expressed in terms of percent of retained asphalt. To standardize this evaluation, a set of 10 sample mixtures representing a scale of from 0 to 100 percent asphalt retention is prepared. By referring to these standard mixtures, the percent of asphalt retained on the aggregate is determined. An additive is considered to pass the boil test when an aggregate retains more than 70% of the original quantity of the mixture of additive and asphalt previously coated onto the aggregate.

FREEZE-THAW TEST

Preparation of Mixtures

In order to minimize the effect of aggregate interlock while maximizing the bond between the aggregate and the asphalt cement, each individual aggregate is first wet sieved to obtain the portion that passes No. 20 sieve and retained on No. 35 sieve (U.S. standard testing sieve series, ASTM E-11). Then 46 g of this aggregate is heated at 160° C. plus or minus 3° C. for at least 2 hours. Three grams of asphalt cement containing 1% by weight of the anti-stripping additive is mixed at 160° C. for 5 minutes. At the appropriate time, the hot aggregate is added to the asphalt and manually mixed as thoroughly and rapidly as possible for 5 minutes. This mixture is then allowed to cool at room temperature for over 30 minutes before compaction of the specimen is begun. The specimen is then compacted by reheating the asphalt concrete mixture at 150° C. for 20 minutes, then transferring the mixture to a steel molding cylinder with a 41.33 mm inside diameter and compacting by applying a constant load of 6200 lbs (2812.32 kg) which corresponds to a force of 27.6 kN for 7 minutes. Generally, 46 g of each individual aggregate will produce a compacted briquet with a uniform height of 19.05 mm, plus or minus 0.127 mm. After compaction, the briquet is extracted from the mold and allowed to cool and cure at room temperature for two days before freeze-thaw cycling.

Test Procedure

The briquet is placed on a cone shaped stress pedestal with only the center of the briquet bottom touching the pedestal. This entire assembly is then placed in a jar with enough distilled water to fill the jar to about one-half inch (12.7 mm) above the test briquet. The jar is then placed in a freezer at a temperature of −12° C. for 15 hours. After this period, the jar is then transferred to a 50° C. oven for 9 hours. At the end of each complete freeze-thaw cycle, the briquet is carefully examined for the appearance of surface cracks. If no cracks are visible, the briquet is subjected to subsequent freeze-thaw cycles until cracks are observed or the test terminated. An additive is considered to pass the freeze-thaw test when the briquet with additive passed more freeze-thaw cycles than the briquet with no additive. A particularly useful additive is one whose briquet passed twenty-five or more freeze-thaw cycles.

TABLE

| RUN NO. | ADDITIVE TYPE | AGGREGATE TYPE | BOIL TEST[1] | FREEZE-THAW TEST[2] |
|---|---|---|---|---|
| A* | None | Davidson | 5 | 6 |
| B | Ex. 1 | Davidson | 100 | >40 |
| C | Ex. 2 | Davidson | 95 | >40 |
| D | Ex. 3 | Davidson | 100 | 17 |
| E | Ex. 4 | Davidson | 100 | >40 |
| F | Ex. 5 | Davidson | 100 | >40 |
| G | Ex. 6 | Davidson | 85 | 13 |
| H | Ex. 7 | Davidson | 100 | 15 |
| I | Ex. 9 | Davidson | 100 | >40 |
| J | Ex. 10 | Davidson | 95 | 11 |
| K | Ex. 11 | Davidson | 100 | >40 |
| L | Ex. 12 | Davidson | 100 | >40 |
| M | Ex. 13 | Davidson | 100 | >40 |
| N* | None | Gifford-Hill | 40 | 6 |
| O | Ex. 1 | Gifford-Hill | 100 | 14 |
| P | Ex. 2 | Gifford-Hill | 100 | 11 |
| Q | Ex. 3 | Gifford-Hill | 100 | 11 |
| R | Ex. 4 | Gifford-Hill | 100 | 18 |
| S | Ex. 5 | Gifford-Hill | 100 | 21 |
| T | Ex. 6 | Gifford-Hill | 100 | 19 |
| U | Ex. 7 | Gifford-Hill | 100 | 18 |
| V | Ex. 8 | Gifford-Hill | 100 | >30 |
| W | Ex. 9 | Gifford-Hill | 100 | 12 |
| X | Ex. 10 | Gifford-Hill | 100 | 12 |
| Y | Ex. 11 | Gifford-Hill | N.T.[3] | 14 |
| Z | Ex. 12 | Gifford-Hill | N.T. | 14 |
| AA | Ex. 13 | Gifford-Hill | N.T. | 10 |
| AB* | None | Waco | 5 | 7 |
| AC | Ex. 1 | Waco | 100 | 9 |
| AD | Ex. 2 | Waco | 100 | 11 |
| AE | Ex. 3 | Waco | 100 | 8 |
| AF | Ex. 4 | Waco | 100 | 10 |
| AG | Ex. 5 | Waco | 100 | 28 |
| AH | Ex. 6 | Waco | 100 | 13 |
| AI | Ex. 7 | Waco | 100 | 4 |
| AJ | Ex. 8 | Waco | N.T. | 7 |
| AK | Ex. 9 | Waco | 100 | 33 |
| AL | Ex. 10 | Waco | 95 | 10 |
| M | Ex. 11 | Waco | N.T. | 32 |
| N | Ex. 12 | Waco | N.T. | 17 |
| O | Ex. 13 | Waco | N.T. | 40 |
| AP* | None | Granite | 90 | 13 |
| AQ | Ex. 1 | Granite | 100 | >40 |
| AR | Ex. 2 | Granite | 100 | >40 |
| AS | Ex. 3 | Granite | 100 | 9 |
| AT | Ex. 4 | Granite | 100 | >40 |
| AU | Ex. 5 | Granite | 100 | >40 |
| AV | Ex. 6 | Granite | 100 | >40 |
| AW | Ex. 7 | Granite | 100 | 19 |
| AX | Ex. 8 | Granite | N.T. | 14 |
| AY | Ex. 9 | Granite | 100 | >40 |
| AZ | Ex. 10 | Granite | N.T. | N.T. |
| BA* | None | Helms | 80 | 9 |
| BB | Ex. 1 | Helms | 100 | 37 |
| BC | Ex. 2 | Helms | 100 | >40 |
| BD | Ex. 3 | Helms | 100 | 20 |
| BE | Ex. 4 | Helms | 100 | 37 |
| BF | Ex. 5 | Helms | 100 | 32 |
| BG | Ex. 6 | Helms | 100 | >40 |
| BH | Ex. 7 | Helms | 100 | 27 |
| BI | Ex. 8 | Helms | N.T. | 31 |
| BJ | Ex. 9 | Helms | 100 | 26 |
| BK | Ex. 10 | Helms | N.T. | 8 |
| BL | Ex. 11 | Helms | N.T. | 26 |
| BM | Ex. 12 | Helms | N.T. | 23 |

TABLE-continued

| RUN NO. | ADDITIVE TYPE | AGGREGATE TYPE | BOIL TEST[1] | FREEZE-THAW TEST[2] |
|---|---|---|---|---|
| BN | Ex. 13 | Helms | N.T. | 35 |

*Not an example of the present invention.
[1]Percentage of asphalt remaining on the aggregate after boiling.
[2]The number of freeze-thaw cycles the asphalt concrete withstood before cracking.
[3]N.T. means that the formulation was not tested.

Additives that pass the boil and freeze-thaw tests are considered to be useful anti-stripping additives for asphalt. The results in the above table clearly shows that the reaction product of an amine with an aldehyde are particularly useful antistripping additives for asphalt with either Davidson, Gifford-Hill, Waco, Granite or Helms type aggregates. Also, the reaction product of a carboxylic acid with amine/aldehyde oligomers is a particularly useful anti-stripping additive for asphalt with Helms type aggregate.

We claim:

1. A composition which comprises a blend of
   (A) bituminous material and
   (B) the product resulting from reacting at a temperature sufficient to complete the reaction
      (1) at least one aldehyde; with
      (2) at least one material selected from
         (a) at least one organic amine;
         (b) at least one organic polyamine;
         (c) at least one hydrohalide salt of an organic amine;
         (d) at least one hydrohalide salt of an organic polyamine; or
         (e) a combination of any two or more of (a), (b), (c) or (d);
   wherein components (1) and (2) are employed in quantities which provide a ratio of carbonyl groups per amine hydrogen atom of
      (i) when the aldehyde is an α,β-ethylenically unsaturated aldehyde, from about 0.025:1 to about 0.6:1; and
      (ii) when the aldehyde is a saturated aliphatic aldehyde, aromatic aldehyde or an unsaturated aldehyde having unreactive carbon-carbon double bonds, from aout 0.025:1 to about 1:1; and
   wherein components (A) and (B) are employed in quantities which provide from about 0.05 to about 10 percent by weight of component (B) based upon the combined weight of components (A) and (B).

2. A composition of claim 1 wherein (a) components (B-1) and (B-2) are employed in quantities which provide a ratio of carbonyl groups per amine hydrogen atom of
   (i) from about 0.12:1 to about 0.33:1 when the aldehyde is an α,β-ethylenically unsaturated aldehyde, and
   (ii) from about 0.12:1 to about 0.6:1 when the aldehyde is a saturated aliphatic aldehyde, aromatic aldehyde or an unsaturated aldehyde having unreactive carbon-carbon double bonds; and (b) components (A) and (B) are employed in quantities which provide from about 0.25 to about 5 percent by weight of component (B) based upon the combined weight of components (A) and (B).

3. A composition of claim 1 wherein components (a) components (B-1) and (B-2) are employed in quantities which provide a ratio of carbonyl groups per amine hydrogen atom of
   (i) from about 0.18:1 to about 0.28:1 when the aldehyde is an α,β-ethylenically unsaturated aldehyde, and
   (ii) from aout 0.14:1 to about 0.5:1 when the aldehyde is a saturated aliphatic aldehyde, aromatic aldehyde or an unsaturated aldehyde having unreactive carbon-carbon double bonds; and (b) components (A) and (B) are employed in quantities which provide from about 0.5 to about 2.5 percent by weight of component (B) based upon the combined weight of components (A) and (B).

4. A composition of claim 3 wherein components (A) and (B) are employed in quantities which provide from about 0.5 to about 1 percent by weight of component (B) based upon the combined weight of components (A) and (B).

5. A composition of claims 1, 2, 3 or 4 wherein (a) component (A) is asphalt; component (B-1) is an aldehyde represented by the formulas

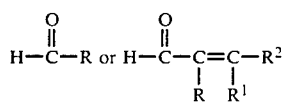

wherein each R, $R^1$ and $R^2$ are independently hydrogen or a hydrocarbyl or hydrocarbyloxy group or substituted hydrocarbyl or hydrocarbyloxy group having from about 1 to about 30 carbon atoms per molecule; component (B-2) is an organic polyamine represented by the formulas

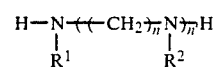

or

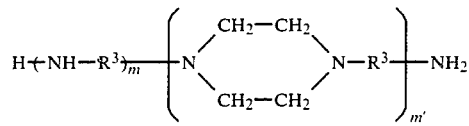

wherein each $R^1$ and $R^2$ is independently hydrogen or a hydrocarbyl group or hydroxy substituted hydrocarbyl group or amine substituted hydrocarbyl group having from about 1 to about 36 carbon atoms; each $R^3$ is independently a divalent hydrocarbyl group having from 1 to about 36 carbon atoms; m has a value from zero to about 8; m' has a value from 1 to about 4; n has a value of 2 or 3 and n' has a value from 1 to about 10; or a partially alkoxylated organic polyamine.

6. A composition of claims 1, 2, 3 or 4 wherein component (B-1) is acrolein, formaldehyde, crotonaldehyde, heptaldehyde, benzaldehyde or a combination thereof and component (B-2) is ethylenediamine, N-(2-aminoethyl)piperazine, diethylenetriamine, triethylenetetramine, tetraethylenepentamine, pentaethylenehexamine, hexaethyleneheptamine or a combination thereof.

7. A composition which comprises a blend of
   (I) bituminous material and
   (II) the product resulting from reacting at a temperature sufficient to complete the reaction
      (A) the product resulting from reacting at a temperature sufficient to complete the reaction
         (1) at least one aldehyde; with (2) at least one material selected from
 (a) at least one organic amine;
 (b) at least one organic polyamine;
 (c) at least one hydrohalide salt or an organic amine;
 (d) at least one hydrohalide salt of an organic polyamine; or
 (e) a combination of any two or more of (a), (b), (c) or (d);
wherein components (1) and (2) are employed in quantities which provide a ratio of carbonyl groups per amine hydrogen atom of
 (i) when the aldehyde is an $\alpha,\beta$-ethylenically unsaturated aldehyde, from about 0.025:1 to about 0.6:1; and
 (ii) when the aldehyde is a saturated aliphatic aldehyde, aromatic aldehyde or an unsaturated aldehyde having unreactive carbon-carbon double bonds, from about 0.025:1 to about 1:1; with
(B) at least one organic material containing a carboxyl group and having less than about 14 carbon atoms;
wherein components (II-A) and (II-B) are employed in quantities which provide a ratio of the number of carboxyl groups per amine hydrogen atom of from about 0.005:1 to about 1.5:1; and wherein components (I) and (II) are employed in quantities which provide from about 0.05 to about 10 percent by weight of component (II) based upon the combined weight of components (I) and (II).

8. A composition of claim 7 wherein
(a) components (II-A-1) and (II-A-2) are employed in quantities which provide a ratio of carbonyl groups per amine hydrogen atom of
 (i) when the aldehyde is an $\alpha,\beta$-ethylenically unsaturated aldehyde, from about 0.18:1 to about 0.28:1; and
 (ii) when the aldehyde is a saturated aliphatic aldehyde, aromatic aldehyde or an unsaturated aldehyde having unreactive carbon-carbon double bonds, from about 0.14:1 to about 0.5:1;
(b) components (II-A) and (II-B) are employed in quantities which provide a ratio of the number of carboxyl groups per amine hydrogen atom of from about 0.025:1 to about 0.5:1; and
(c) components (I) and (II) are employed in quantities which provide from about 0.5 to about 2.5 percent by weight of component (II) based upon the combined weight of components (I) and (II).

9. A composition of claim 8 wherein
(a) components (II-A) and (II-B) are employed in quantities which provide a ratio of the number of carboxyl groups per amine hydrogen atom of from about 0.05:1 to about 0.25:1; and (b) components (I) and (II) are employed in quantities which provide from about 0.5 to about 1 percent by weight of component (II) based upon the combined weight of components (I) and (II).

10. A composition of claims 7, 8 or 9 wherein
(a) component (I) is asphalt; Component (II-B) has less than about 10 carbon atoms;
(b) component (II-A-1) is an aldehyde represented by the formulas

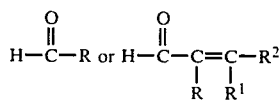

wherein each R, $R^1$ and $R^2$ are independently hydrogen or a hydrocarbyl or hydrocarbyloxy group or substituted hydrocarbyl or hydrocarbyloxy group having from about 1 to about 20 carbon atoms per molecule;
(c) component (II-A-2) is an organic polyamine represented by the formulas wherein each $R^1$ and $R^2$ is independently hydrogen or a hydrocarbyl group or hydroxyl substituted hydrocarbyl group or amine substituted hydrocarbyl group having from about 1 to about 36 carbon atoms; each $R^3$ is independently a divalent hydrocarbyl group having from 1 to about 36 carbon atoms; m has a value from zero to about 8; m' has a value from 1 to about 4; n has a value of 2 or 3 and n'

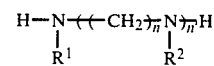

or

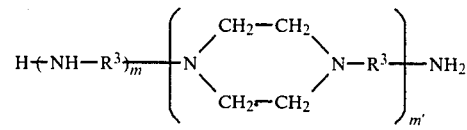

has a value from 1 to about 10; or a partially alkoxylated organic polyamine.

11. A composition of claims 7, 8 or 9 wherein
(a) component (II-A-1) is acrolein, formaldehyde, crotonaldehyde, heptaldehyde, benzaldehyde or a combination thereof;
(b) component (II-A-2) is ethylenediamine, N-(2-aminoethyl)piperazine, diethylenetriamine, triethylenetetramine, tetraethylenepentamine, pentaethylenehexamine, hexaethyleneheptamine or a combination thereof; and
(c) component (II-B) is a dodecanoic acid.

* * * * *